N. JOLEEN.
ELECTRICAL DISTRIBUTION.
APPLICATION FILED MAY 28, 1914.
1,159,040.
Patented Nov. 2, 1915.
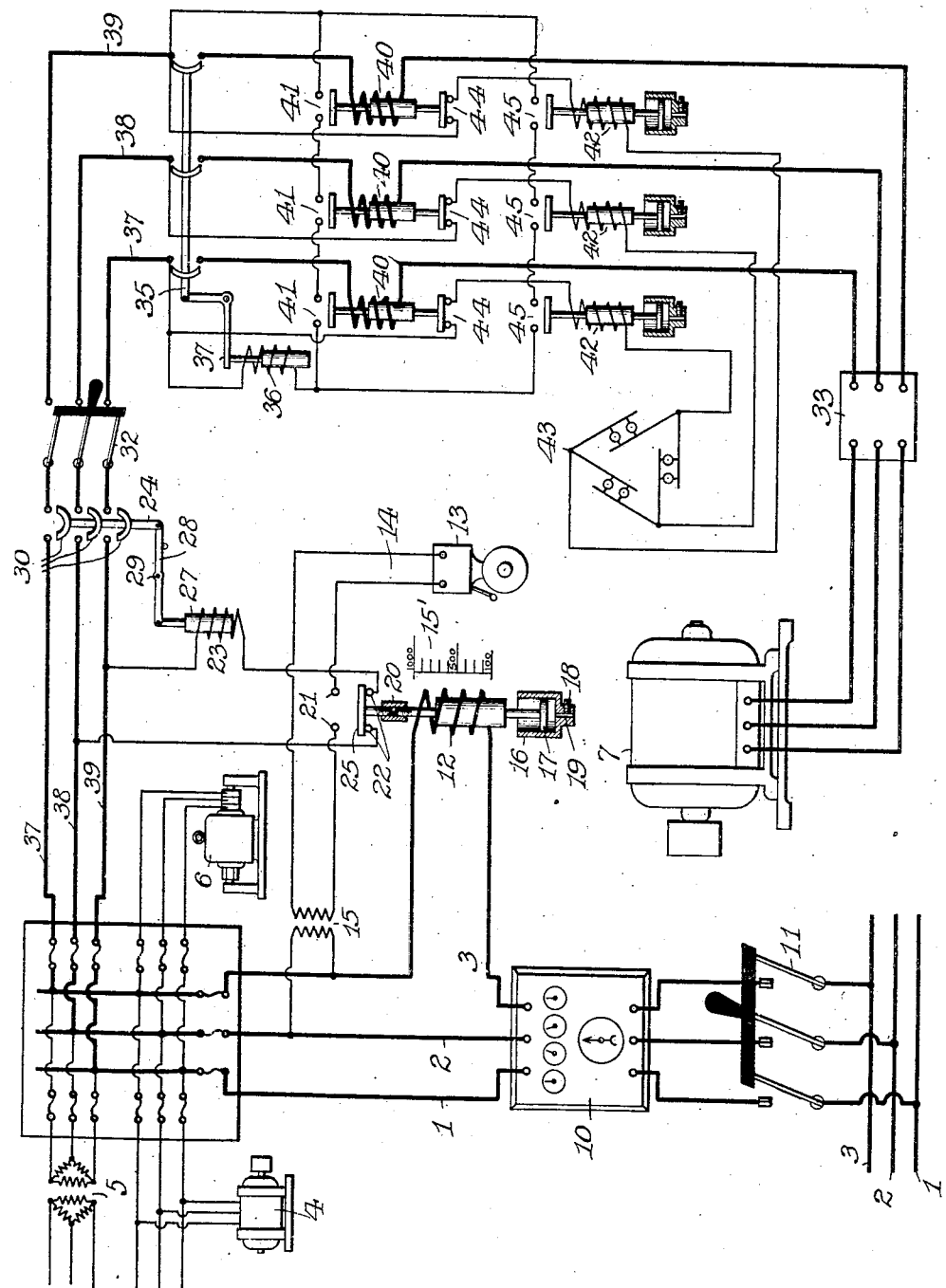
Witnesses
Leonard W. Novander
John A. Dirnner
Inventor
Nels Joleen
By Brown, Hanson & Boettcher
Att'ys

UNITED STATES PATENT OFFICE.

NELS JOLEEN, OF CHICAGO, ILLINOIS.

ELECTRICAL DISTRIBUTION.

1,159,040.  Specification of Letters Patent.  Patented Nov. 2, 1915.

Application filed May 28, 1914. Serial No. 841,442.

*To all whom it may concern:*

Be it known that I, NELS JOLEEN, a citizen of the United States, residing at Chicago, in the county of Cook and State of Illinois, have invented certain new and useful Improvements in Electrical Distribution, of which the following is a full, clear, concise, and exact description, reference being had to the accompanying drawings, forming a part of this specification.

My invention relates to a system of electrical distribution.

In modern central station practice it is desirable to operate the power generating apparatus continuously at a uniform load for the obvious reason of promoting efficiency and good service. To secure this, it is necessary to prevent, as far as possible, any considerable fluctuation of load at the consumers' stations. One manner of promoting this is to fix the charges for power upon a basis of maximum demand. This subjects the consumer to a charge extending over a given period of time which charge is largely in proportion to the maximum amount which he has demanded during such time. In many cases, consumers using a large total current employ a number of units each taking a varying amount of power. The total maximum capacity of these units is usually in excess of the maximum which the consumer would demand if the various units were operated in such a manner that when one unit would be performing operation requiring a large amount of power, another unit would be doing work requiring a small amount of power or would be stopped altogether.

The main object which this invention has in view is to provide means to aid the consumer in maintaining a fairly constant load, although using units demanding varying amounts of power.

Another object of the invention is to provide means which will automatically reduce the total load when a condition of peak load is approached.

In the accompanying drawing, which forms part of this specification, I have shown diagrammatically a system embodying my invention. The invention is not to be considered as limited to the above specific embodiment, as I have shown the same to illustrate an operative embodiment of the invention in order to comply with the statutes governing in such a case.

The diagram of the figure represents a consumer's station connected to the three phase mains 1, 2 and 3. Four units, each consuming various amounts of current, are indicated in the drawing as a motor 4, a transformer 5, a rotary converter 6 and another motor 7. It is to be understood that these devices are merely diagrammatic and illustrative of the various units which a consumer might employ. It is to be understood further that any number of units of any preferred capacity may be employed as this feature forms no part of the invention.

A maximum demand indicator 10 of any preferred construction is connected in the mains 1, 2 and 3 adjacent the main switch 11, both of these devices being preferably placed on a switch board or panel.

Heretofore in operating a number of motors or other pieces of apparatus, the consumer has been unable to limit the maximum demand to any precise or even approximate figure as the operators of the various machines have no knowledge of the conditions obtaining in the circuits and each one of the devices may be drawing a maximum when the same is entirely unnecessary. For instance, if a number of cranes are employed, it would be entirely possible for each one of the cranes to be lifting a heavy weight all at the same time but obviously this is not necessary in the ordinary operation of a yard as one crane might be doing light work when another is lifting a particularly heavy object since both classes of objects are available to the various cranes.

A relay 12 is connected in series with one of the phases, in this case phase 3, and assuming a balanced load, the current flowing through this relay is proportional to the entire current flowing in the mains, and hence, to the power consumed.

It is obvious that instead of the relay being placed directly in series, it may be operated on a series transformer connected to one or more of the mains. An alarm 13 connected in a circuit 14 is controlled by the relay 12 whenever the current in the mains raises to a predetermined value. The relay 12 may be adjusted to respond to definite current values as indicated on the scale 15'. The relay may be graduated in terms of current or in terms of kilowatts, inasmuch as the voltage across the mains is practically constant. This relay is preferably of the time limit type requiring a certain time within which it operates after the attainment of the current to which it has been set for operation. This may be secured in a number of ways well known in the art. I have shown the relay as controlled by an air dash pot 16 and a plunger 17. The speed of the plunger may be regulated by the adjusting screw 18 which controls the vent 19. This showing is merely diagrammatic and any preferred type of time element may be employed to secure a time interval either before any movement of the contacts occur or between the time of opening one contact and closing another. The position of the solenoid core with respect to the solenoid may be varied to secure response to a predetermined current value in the winding of said solenoid. I have indicated this by adjusting means 20 but it is understood that this is merely diagrammatic and any preferred means may be employed. This time limit relay 12 controls two pairs of switch points 21 and 22, the switch points 21 being connected in the alarm circuit 14 and the switch points 22 being connected in the circuit of a solenoid 23 operating a remote control switch 24.

The bridging contact 25 of the relay is normally in contact with the switch points 22 to maintain the remote control switch 24 in closed position when the main switch 11 is closed. The remote control switch 24 is connected in the circuit of the motor 7. This motor represents a load of less importance than the loads 4, 5 and 6 and may be disconnected for a time without any considerable disadvantage. By disconnecting this motor the load upon the entire system is decreased so that if the excess current taken at this time be not too great disconnection of this load 7 will bring the total load below the predetermined maximum. The remote control switch 24 is normally held in closed position by the action of the solenoid upon the core 27. This core, when attracted by the solenoid, swings the lever 28 about the pivot 29 to inclose the bridging contacts 30. A manual switch 32 and a motor controller 33 may also be provided in the circuit of the motor 7.

In order to maintain the load balanced at all times each one of the feeder circuits to the various loads may be provided with the protective device shown at the right of the figure. This comprises a remote control switch 35 operated by a solenoid 36 by means of the lever 37. Solenoids 40 connected in each one of the feeder mains 37, 38 and 39 close a circuit at contacts 41 for the solenoid 36 to maintain the switch 35 in closed position. Rupture of any one of the phases will, of course, open the series circuit containing the contacts 41 to open the main switch 35. Upon repair of the broken main the relays 42 connected in series to an artificial load 43 through the lower contacts 44 of the relays 40 close the circuit of the remote control switch through series contacts 45 insuring a balancing of the phases at all times. The use of this protective device is optional and forms no part of the present invention.

The operation of the system is as follows: The relay 12 is adjusted at the desired maximum point above which the customer does not desire the consumption of power to rise. Suppose the legitimate maximum at which it would be possible to operate economically on the apparatus at the consumer's station to be 100 K. W., the relay 12 will then be set at that figure. Assuming that the switches 11 and 32 are closed and that each one of the loads is drawing current, the relay 12 will not be operated until the predetermined maximum of 100 K. W. is exceeded. When this occurs, the first action of relay 12 will be to cause opening of the circuit of the motor 7 to relieve the load. If this is sufficient to take care of the temporarily excessive demand, the alarm 13 will not be sounded as a time interval elapses before the contact 25 can close the alarm circuit 14. Upon the cessation of the excessive demand, the switch 24 will again be closed as the relay 12 drops back to normal. The motor 7 will again start up in the usual manner. If disconnection of the motor 7 is insufficient to bring the power demand below the maximum, the contact 25 will close the circuit 14 at the contacts 21 and cause the alarm 13 to be sounded. A number of alarms may be connected at various points so that the attendants or operators at the various electrical devices, which constitute the load, may be apprised of the condition obtaining in the circuit. Each operator or attendant will thereupon make efforts to reduce the load to the point where the alarm is no longer sounded; thereby they will know that the predetermined maximum is not being exceeded. The instructions issued to each attendant or operator will be to the effect that under no condition shall the alarm be allowed to sound, and if it should sound, to reduce the load to the point where the alarm cease. This can very readily be brought about without any loss of time, especially in such place as where a number of operations demanding greater or less amounts of power are to be performed by the various machines which constitute the load. Thus if one of the motors is engaged in a particular piece of work demanding a very considerable amount of power, another motor may, without any loss, be employed on a piece of work demanding a small amount of power. By thus securing a coöperation of the operators of the various machines a practically uniform load may be attained on the supply mains.

The alarm circuit 14 is shown as connected by means of a transformer 15 to the phase 2, 3. It is obvious that the transformer may be fed by a separate source of current. It is also obvious that the maximum demand relay 12 may be employed under a load which is not balanced as the setting of this relay does not need to be of very great exactness.

I may also employ a number of these relays operating at different power demands or at different time intervals for sounding an alarm. I may also connect thereto a greater or less number of remote control relays for shutting down loads of minor importance, such as the load 7, to bring the demand of power within a predetermined maximum. This system of securing coöperation between the various machines in order to confine the demand within a predetermined maximum is applicable not only to a three phase system of electrical distribution, but to a system of any other number of phases or to a direct current system, the particular type of transmission being of no part of the essence of my invention. The particular practical advantage secured by the invention is a coöperation of the operators of the various loads to perform the desired operations in such a manner as not to exceed the predetermined maximum.

The invention above described is capable of use in different relations and under different conditions and may be subject to numerous modifications which may at once be apparent to those skilled in the art, but I consider that the above fall within the scope and spirit of my invention as I consider the invention as broadly new.

While I have described and shown a particular embodiment of my invention, I do not intend, in any manner, to be limited by the details of the embodiment so shown and described, except as such limitations may form part of the appended claims.

What I claim as new and desire to secure by Letters Patent of the United States is:

1. In a maximum demand meter system, electrical distribution mains, a relay in series relation with said mains, said relay operable upon a predetermined current value, an alarm, a circuit therefor controlled by said relay, and timing means to delay the action of said relay after said predetermined current value is attained.

2. In a maximum demand system, a maximum demand meter having a definite time limit for allowing excess current to be drawn, distributing mains in series with the maximum demand meter, a relay in series relation with said meter, an alarm circuit controllable by said relay, and a timing element for delaying the action of said relay in controlling said alarm circuit.

3. In a maximum demand system, a maximum demand meter, distributing mains in series with said meter, a relay in series relation with said meter, an alarm circuit controllable by said relay, and a timing element for delaying the action of said relay in controlling said alarm circuit, said timing element being adjusted to cause the alarm circuit to become active prior to registration of the demand value by said meter.

4. In a system of the class described, supply mains, feeder circuits connected to said supply mains, a normally open alarm circuit, relay means connected in series relation with said feeder circuits, said relay means being rendered operable upon a predetermined current value to close said circuit, and a time element to delay the closing of said alarm circuit after said predetermined current value is attained.

5. In a system of the class described, supply mains feeder mains connected thereto, a maximum demand meter in series with said feeder mains, relay means in series relation with said feeder mains, said relay means being operable upon substantially the predetermined maximum current which it is desired to maintain, a normally open alarm circuit adapted to be closed by said relay means, and timing means governing said relay means to delay the closing of said alarm circuit after the predetermined maximum value is attained.

6. In a system of the class described, supply mains, a plurality of feeder circuits connected to said supply mains, said feeder-circuits having translating devices therein requiring variable amounts of current, an alarm, and a magnet connected in series relation to said supply mains, said magnet operating upon a predetermined value of current in said mains for reducing the power demand of a particular one of said translating devices and thereafter to cause sounding of said alarm.

7. In a system of the class described, supply mains, a plurality of feeder circuits connected to said supply mains, said feeder-circuits having translating devices therein requiring variable amounts of current, an alarm and electroresponsive means operable by a predetermined current value in said mains for reducing the power demand of a particular one of said translating devices and thereafter to cause actuation of said alarm, said electroresponsive means connected in series relation with said main.

8. In a system of the class described, supply mains, a plurality of feeder circuits connected to said supply mains, said feeder-circuits having translating devices therein requiring variable amounts of current, a normally open alarm circuit connected to said mains and a relay in series relation to said mains, said relay operable at a predetermined current value for reducing the power demand of a particular one of said translating devices and thereafter to close said alarm circuit.

9. In a system of the class described, supply mains, a plurality of feeder circuits connected to said supply mains, said feeder-circuits having translating devices therein requiring variable amounts of current, a normally open alarm circuit having relay means connected in series relation to said supply mains, said relay means operable on a predetermined current value for reducing the power demand of a particular one of said translating devices and thereafter to close said alarm circuit only upon the occurrence of a predetermined current in said mains for a predetermined time.

10. In a system of the class described, supply mains, a plurality of feeder circuits connected to said said supply mains, said feeder-circuits having translating devices requiring variable amounts of current, a normally open alarm circuit, relay means connected in series relation to said supply mains, said relay being operable on a predetermined current value for reducing the power demand of a particular one of said translating devices and thereafter to close said alarm circuit only upon the occurrence of a predetermined current value in said mains for a predetermined time, said relay means having means to alter the effect of the current on said relay means whereby the current required to operate said relay is predeterminable at substantially any desired value.

11. In a system of the class described, supply mains, a plurality of feeder circuits connected to said supply mains, said feeder-circuits having translating devices requiring variable amounts of current, a normally open alarm circuit, relay means connected in series relation to said supply mains, said relay being operable on a predetermined current value for reducing the power demand of a particular one of said translating devices and thereafter to close said alarm circuit only upon the occurrence of a predetermined current in said mains for a predetermined time, said relay having means to alter the time within which it responds to the predetermined current value.

12. In a system of the class described, supply mains, a plurality of feeder circuits of various relative importance, a switch in a circuit of less importance, a normally open alarm circuit, a relay connected in series relation with said supply mains and operable to open said switch upon the attainment of a total current value in said mains in excess of a predetermined maximum, said relay being operable only upon the attainment of a predetermined maximum value of current in said mains to open said feeder circuit and to close said alarm circuit.

13. In combination, supply mains, a plurality of feeder-circuits connected thereto, said feeder-circuits having translating devices requiring varying amounts of power, said translating devices being under the control of the attendant for determining the distribution of current thereto, an alarm device, a relay device operable on a given current value in said mains to first redistribute the current among said translating devices and upon the expiration of a predetermined time to give an alarm by said alarm device for attaining a second redistribution of current.

14. In combination, supply mains, a plurality of feeder-circuits connected thereto, said feeder-circuits having translating devices requiring varying amounts of power, said translating devices being under the control of the attendants for determining the distribution of current thereto, relay means in series relation with said supply mains, said relay means operable on a given current value to redistribute the current among said translating devices, alarm means operated by said relay device only after said redistribution of the current, said alarm means being actuated to warn the operators of an excessive flow of current through said supply mains to said translating devices.

15. In combination, supply mains, a plurality of feeder-circuits connected to said mains, said feeder-circuits having translating devices therein requiring variable amounts of current, a maximum-demand meter for said plurality of feeder-circuits, a relay in series relation with said maximum-demand meter, means for reducing the power-demand on one of said feeder-circuits, and alarm means for said feeder-circuits, said relay operating said first means at substantially a lower value than the maximum demand and operating said alarm means at substantially or above maximum demand.

In witness whereof, I hereunto subscribe my name this 14th day of May, A. D. 1914.

NELS JOLEEN.

Witnesses:
JOHN A. DIRNNER,
LEONARD W. NOVANDER.